United States Patent
Cook et al.

(10) Patent No.: US 11,200,144 B1
(45) Date of Patent: Dec. 14, 2021

(54) REFINEMENT OF STATIC ANALYSIS OF PROGRAM CODE

(71) Applicant: Amazon Technologies, Inc., Seattle, WA (US)

(72) Inventors: John Cook, Brooklyn, NY (US); Kalpana Gondi, Edison, NJ (US); Michael Tautschnig, London (GB)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 15/696,056

(22) Filed: Sep. 5, 2017

(51) Int. Cl.
*G06F 11/36* (2006.01)

(52) U.S. Cl.
CPC ...... *G06F 11/3608* (2013.01); *G06F 11/3616* (2013.01)

(58) Field of Classification Search
CPC ............ G06F 11/3608; G06F 11/3616; G06F 11/3604
See application file for complete search history.

(56) References Cited

U.S. PATENT DOCUMENTS

| | | | |
|---|---|---|---|
| 7,926,039 B2 | 4/2011 | Wang et al. | |
| 7,975,257 B2 | 7/2011 | Fanning et al. | |
| 8,365,152 B2 | 1/2013 | Balakrishnan et al. | |
| 8,732,673 B2 | 5/2014 | Finking et al. | |
| 8,850,405 B2 | 9/2014 | Fink et al. | |
| 9,530,016 B1 | 12/2016 | Pomerantz | |
| 2008/0244536 A1* | 10/2008 | Farchi ............. | G06F 8/433 717/130 |
| 2012/0233599 A1* | 9/2012 | Valdiviezo Basauri et al. ............ | G06F 8/41 717/126 |
| 2014/0244645 A1* | 8/2014 | Muske ............. | G06F 9/44589 707/737 |
| 2014/0282421 A1* | 9/2014 | Jubran ............. | G06F 11/3664 717/126 |
| 2015/0220419 A1* | 8/2015 | Cassez ............. | G06F 11/0718 717/124 |
| 2016/0315960 A1* | 10/2016 | Teilhet ............. | H04L 63/1433 |

(Continued)

OTHER PUBLICATIONS

Tukaram Muske et al., "Review efforts reduction by partitioning of static analysis warnings", 2013 [retrieved on Feb. 17, 2019], 13th International Working Conference on Source Code Analysis and Manipulation (SCAM), pp. 106-115, downloaded from Internet at <url>:https://ieeexplore.ieee.org. (Year: 2013).*

(Continued)

*Primary Examiner* — S. Sough
*Assistant Examiner* — Stephen D Berman
(74) *Attorney, Agent, or Firm* — Robert C. Kowert; Kowert, Hood, Munyon, Rankin & Goetzel, P.C.

(57) ABSTRACT

Methods, systems, and computer-readable media for refinement of static analysis of program code are disclosed. A report is received. The report was generated using initial static analysis of program code. The report indicates a plurality of warnings regarding the program code, at least some of which represent potential flaws, and the warnings are associated with a plurality of segments of the program code. Additional analysis of the segments of program code is performed. The additional analysis differs at least in part from the initial static analysis. Based at least in part on the additional analysis, at least some of the warnings are determined to represent false positives.

17 Claims, 12 Drawing Sheets

(56) References Cited

U.S. PATENT DOCUMENTS

2017/0075787 A1* 3/2017 Muske ............... G06F 11/3608

OTHER PUBLICATIONS

"HP Fortify on Demand User Guide—FoD Release 3.2", Hewlett-Packard, May 2014, Retrieved from URL: https://saas.hpe.com/sites/default/files/resources/files/HP%20Fortify%20on%20Demand_06-16-2014.pdf, pp. 1-58.

Ranjit Jhala, et al., "Software Model Checking", ACM Journal Name, vol. V, No. N, Oct. 2009, Retrieved from URL: https://people.mpi-sws.org/~rupak/Papers/SoftwareModelChecking.pdf, pp. 1-57.

Kenneth L. McMillan, "Symbolic Model Checking: An approach to the state explosion problem", May 1992, Retrieved from URL: http://www.kenmcmil.com/pubs/thesis.pdf, pp. 1-214.

* cited by examiner

REFINEMENT OF STATIC ANALYSIS OF PROGRAM CODE

BACKGROUND

Static code analysis represents an automated approach for detecting flaws in program source code without necessarily executing the code. By analyzing source code or bytecode, static analysis may find and flag potential security vulnerabilities, violations of industry standards, and flaws that would not necessarily be manifested during execution of the program. A tool for static code analysis may operate by instrumenting the source code and looking for programming constructs that are known to be the cause of common programming or security mistakes. For example, the static analysis tool may look for potentially troublesome idioms such as dereferencing a pointer without checking for a null pointer. The tool may analyze the entire set of source code for a project or application and may produce a list of warnings based on the static analysis. However, the findings of the tool may include numerous false positives that do not represent actual errors, flaws, security vulnerabilities, and so on. The presence of such false positives in the results may represent "noise," and the noise may render the findings difficult to interpret and prioritize. Manual review by a developer to sift through the noise may be time-consuming and subject to human error.

Figure 1A:
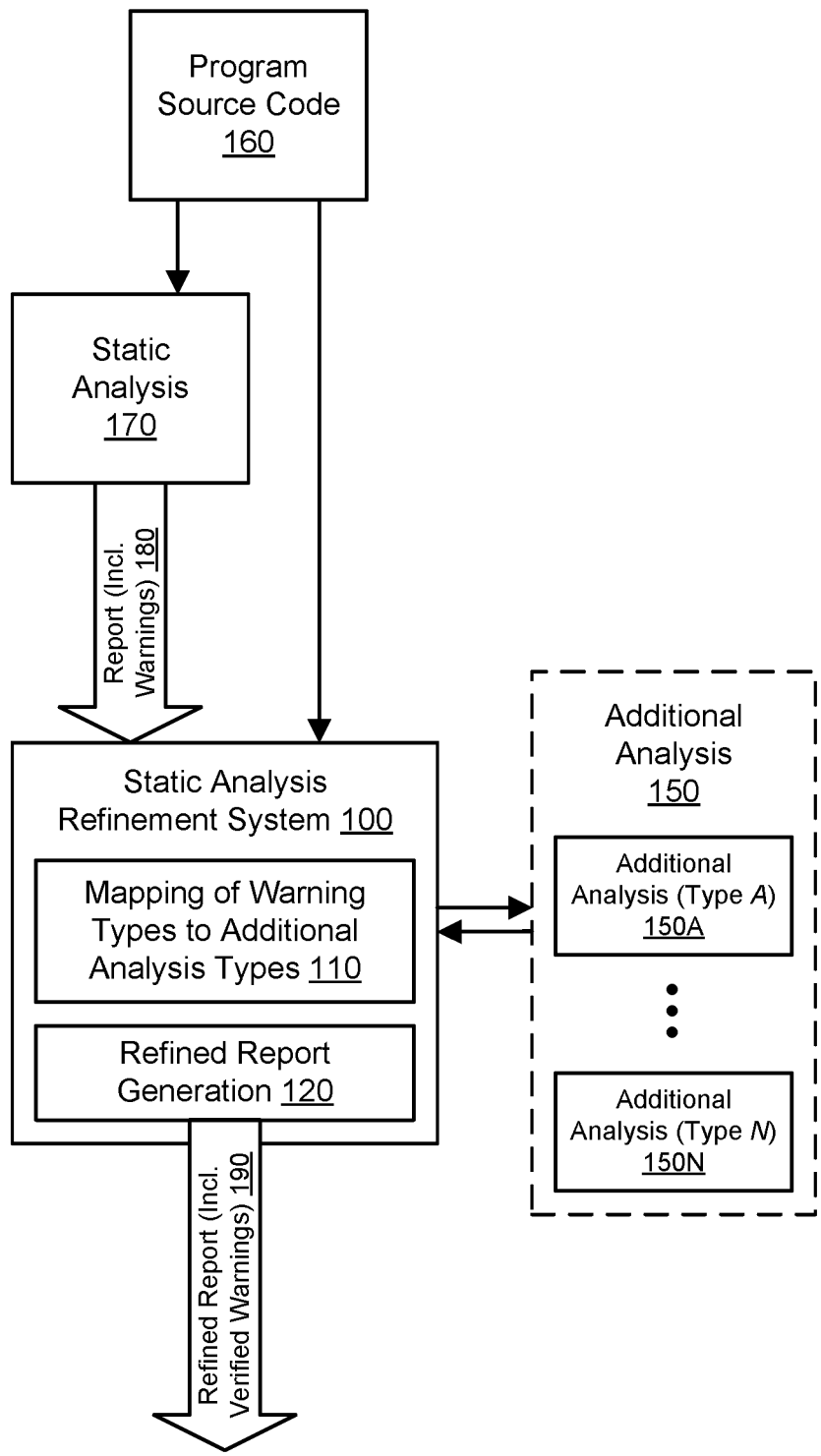
FIG. 1A, FIG. 1B, FIG. 1C, and FIG. 1D illustrate an example system for refinement of static analysis of program code, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for refinement of static analysis of program code are described. Using the techniques described herein, warnings generated by static analysis of program source code may be automatically filtered to annotate or remove false positives. A static analysis tool may analyze the source code of a program and generate a report that includes warnings about particular segments of the code. The warnings may indicate potential errors, flaws, security vulnerabilities, violations of industry standards, and so on. A static analysis refinement system may use the report as input, along with the source code. For at least some of the warnings in the initial report, the static analysis refinement system may perform, initiate, or invoke additional analysis of individual segments of program code in an attempt to detect true positives (verified warnings) or detect false positives (e.g., warnings that do not represent genuine errors or flaws). The additional analysis may include static analysis (analysis of the program code without execution of the program) and/or dynamic analysis (analysis based on execution of the program). The additional analysis techniques may vary based (at least in part) on the type of warning. For example, some warning types may be subjected to additional analysis using model checking, while other warning types may be subjected to data flow analysis, and yet other warning types may be subjected to syntactic checking. The additional analysis techniques may often be more precise than the static analysis techniques used in generating the initial report. The additional analysis techniques may often be more expensive (e.g., in terms of processor and memory resources) than the static analysis techniques used in generating the initial report, and so the use of such techniques may be feasible only for segments of the program code rather than the entire set of program code. Based (at least in part) on the additional analysis, the static analysis refinement system may automatically generate a refined report that indicates the verified warnings and excludes or annotates the false positives. The static analysis refinement system may also recommend code fixes or apply code patches to correct some types of verified warnings. By filtering numerous false positives, the refined report may be used more efficiently by a developer to correct genuine errors, flaws, and vulnerabilities in a program.

FIG. 1A, FIG. 1B, FIG. 1C, and FIG. 1D illustrate an example system for refinement of static analysis of program code, according to one embodiment. A static analysis refinement system 100 may use, as input, program source code 160 along with a report 180 that indicates warnings regarding that source code. The program source code 160 may be written in any number of suitable programming languages, such as C source code, C++ source code, Java® bytecode, and so on. The program source code 160 may include one or more build artifacts such as object files, class files, JAR files (Java® archives), and so on. A portion of the source code in a particular build artifact, or potentially an entire build artifact, may be referred to as a segment or snippet of the code. In one embodiment, the static analysis refinement system 100 may use, as input, a mapping between names of source files (e.g., as referenced in the report 180) and particular build artifacts. In one embodiment, the static analysis refinement system 100 may use, as input, information from the build process such as preprocessing and compile options for C and C++ code.

The code 160 may include numerous errors, flaws, vulnerabilities, and other problematic constructs or elements. Using static analysis of the code 160, a static analysis tool 170 may attempt to find and report such errors, flaws, and vulnerabilities as warnings in the report 180. The static analysis tool 170 may operate by instrumenting the source code and looking for programming constructs that are known to be the cause of common programming or security mistakes. For example, the static analysis tool 170 may look for potentially troublesome idioms such as dereferencing a pointer without checking for a null pointer. The static analysis tool 170 may analyze the entire set of source code 160 associated with a project or application and may produce a report 180 with warnings based on the static analysis. In many cases, however, the report 180 may include numerous "false positives," e.g., warnings that do not represent genuine errors, flaws, or vulnerabilities. The report 180 may also include "true positives," e.g., warnings that do indeed represent genuine errors, flaws, or vulnerabilities. The presence of many false positives may represent noise in the report 180. Such noise may render the report 180 difficult for a developer to interpret and prioritize.

For at least some of the warnings in the initial report 180, the static analysis refinement system 100 may perform, initiate, or invoke additional analysis 150 of individual segments of the program code 160 in an attempt to detect true positives (verified warnings) or detect false positives (e.g., warnings that do not represent genuine errors or flaws). In one embodiment, false positives may be identified with some degree of certainty while identification of true positives may have a lesser degree of certainty. As shown in the example of FIG. 1A, the additional analysis 150 may include a variety of techniques or tools for code analysis, such as additional analysis (type A) tool 150A through additional analysis (type N) tool 150N. One or more of the additional analysis techniques 150 used for a particular warning may vary based (at least in part) on the type of warning, as indicated in the report 180. For example, some warning types may be subjected to additional analysis using model checking, while other warning types may be subjected to data flow analysis, and yet other warning types may be subjected to syntactic checking. The static analysis refinement system 100 may include a component 110 for mapping of warning types to additional analysis types. Based (at least in part) on the additional analysis 150 of the warnings in the initial report 180, the static analysis refinement system 100 may generate a refined report 190 using a component 120 for refined report generation. In one embodiment, the refined report 190 may include warnings that have been verified as true positives with the additional analysis 150. In one embodiment, the refined report 190 may exclude warnings that have been determined to represent false positives with the additional analysis 150. In one embodiment, the refined report 190 may include both true positives and false positives, and individual warnings may be annotated as true positives and/or false positives accordingly.

In one embodiment, if the static analysis refinement system 100 is unable to determine whether a warning represents a true positive or a false positive, the refined report 120 may include the warning; the warning may be annotated to indicate that its status as a false positive or true positive is unknown. For example, if a particular warning type is not supported by the static analysis refinement system 100, then the system may not perform additional analysis for that warning and may pass the warning on to the developer in the refined report 190 with an indication of the unknown status. As another example, if one or more additional analysis techniques 150 cannot decide whether a particular warning is a false positive or a true positive, then the static analysis refinement system 100 may pass the warning on to the developer in the refined report 190 with an indication of the unknown status. As a further example, if the additional analysis for a warning times out (e.g., based on a predetermined timeout), then the static analysis refinement system 100 may pass the warning on to the developer in the refined report 190 with an indication of the unknown status. As yet another example, the static analysis refinement system 100 may not perform additional analysis for a warning that has been manually triaged by a developer to indicate its known importance.

The additional analysis techniques 150 may be more precise than the static analysis 170 used in generating the initial report 180. For a given segment, the additional analysis techniques 150 may be more expensive (e.g., in terms of processor and memory resources) than the static analysis 170 used in generating the initial report 180, and the use of such techniques may be feasible only for segments of the program code 160 rather than the entire set of program code. By filtering numerous false positives, in some cases representing around 50% of the warnings, the refined report 190 may be used more efficiently by a developer to correct genuine errors, flaws, and vulnerabilities in a program.

In some embodiments, the static analysis refinement system 100 may output metrics related to the additional analysis 150, refined report 190, and/or original report 180. The metrics may be presented to a developer (e.g., in a graphical user interface) or otherwise may be made available in one or more reports. The metrics may indicate statistics related to the frequency of various warning types, how many true positives were determined for each warning type (e.g., a count and/or percentage), how many false positives were determined for each warning type (e.g., a count and/or percentage), how many unknown statuses were determined for each warning type (e.g., a count and/or percentage), the success rate of various tools for the additional analysis 150, the duration of execution for the various tools, any timeouts reached in attempting the additional analysis, and so on.

In one embodiment, a user may provide a time budget to the static analysis refinement system 100. The time budget may relate collectively to all of the additional analysis 150 and/or to additional analysis for individual warnings. The additional analysis 150 may be performed within the time budget. In one embodiment, following completion of the additional analysis 150, metrics related to the time budget may be presented or made available to the user.

The static analysis refinement system 100 may represent an extensible framework for refining a static analysis report 180, such that numerous types of static analysis tools or utilities 170 may be used as input to the system. For example, the static analysis refinement system 100 may accept and refine a list of warnings produced by a static analysis tool named Fortify (commercially available from Hewlett-Packard Enterprise Security Products). As another example, the static analysis refinement system 100 may accept and refine a list of warnings produced by a static analysis tool named Coverity® (commercially available from Synopsys).

Figure 1B:
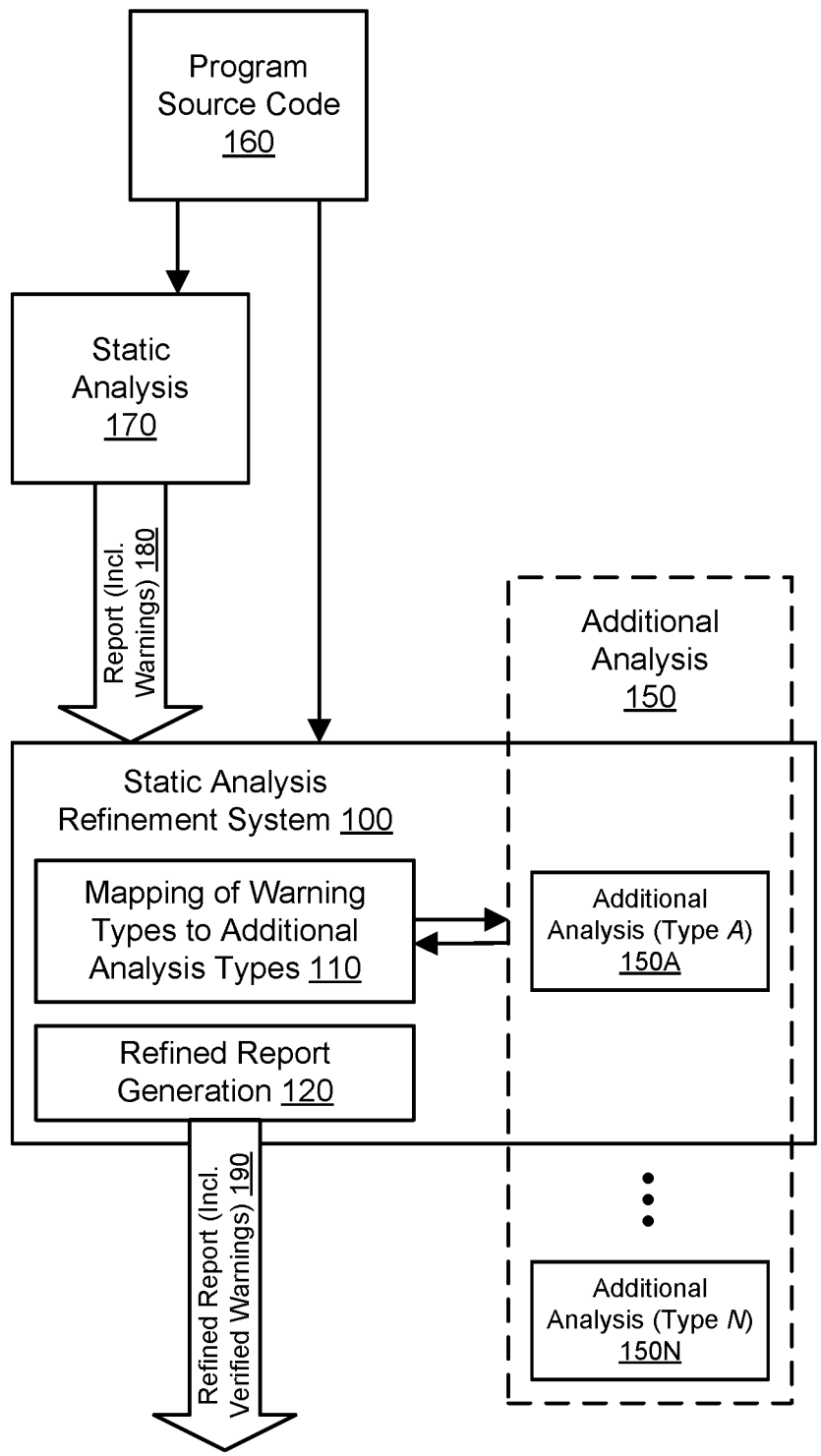
Figure 1C:
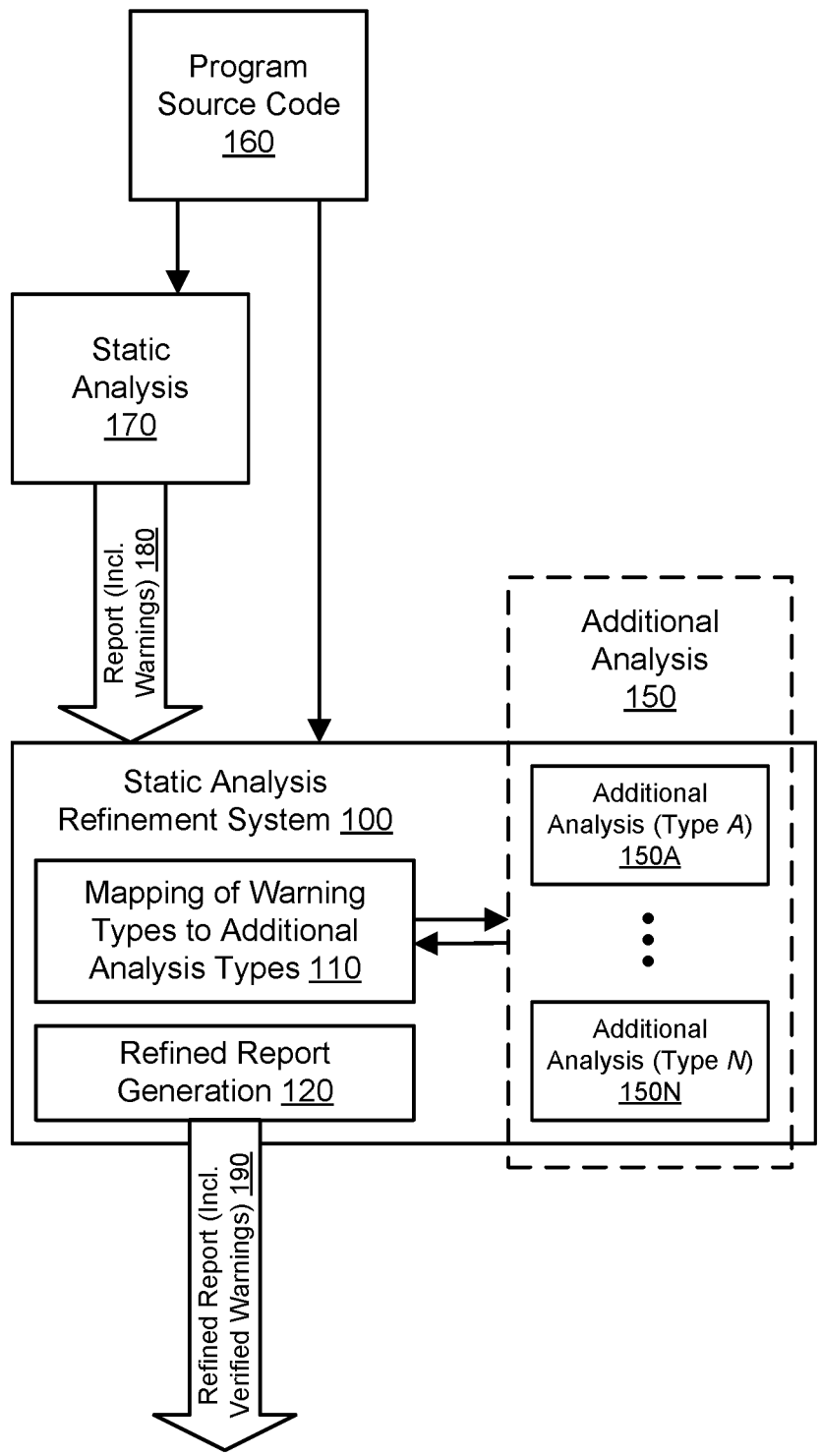

The static analysis refinement system 100 may represent an extensible framework for refining the static analysis report 180, such that numerous types of tools or utilities for additional analysis 150 may be used with the system. In one embodiment, the additional analysis 150 may include one or more tools or utilities that perform static analysis without necessarily executing the program corresponding to the program code. In one embodiment, the additional analysis 150 may include one or more tools or utilities that perform dynamic analysis based on executing the program corresponding to the program code. As shown in FIG. 1A, the additional analysis tools 150A-150N may be external to the static analysis refinement system 100. For example, the additional analysis tools 150A-150N may represent various external utilities that can be invoked by the static analysis refinement system 100, e.g., via command line or via an application programming interface (API). As shown in FIG. 1B, the additional analysis tools 150A-150N may be both internal and external with respect to the static analysis refinement system 100. Internal tools or utilities may represent functions, subroutines, or other components that are bundled or compiled with one or more programs that implement the static analysis refinement system 100. As shown in FIG. 1C, the additional analysis tools 150A-150N may be internal to the static analysis refinement system 100.

Figure 1D:
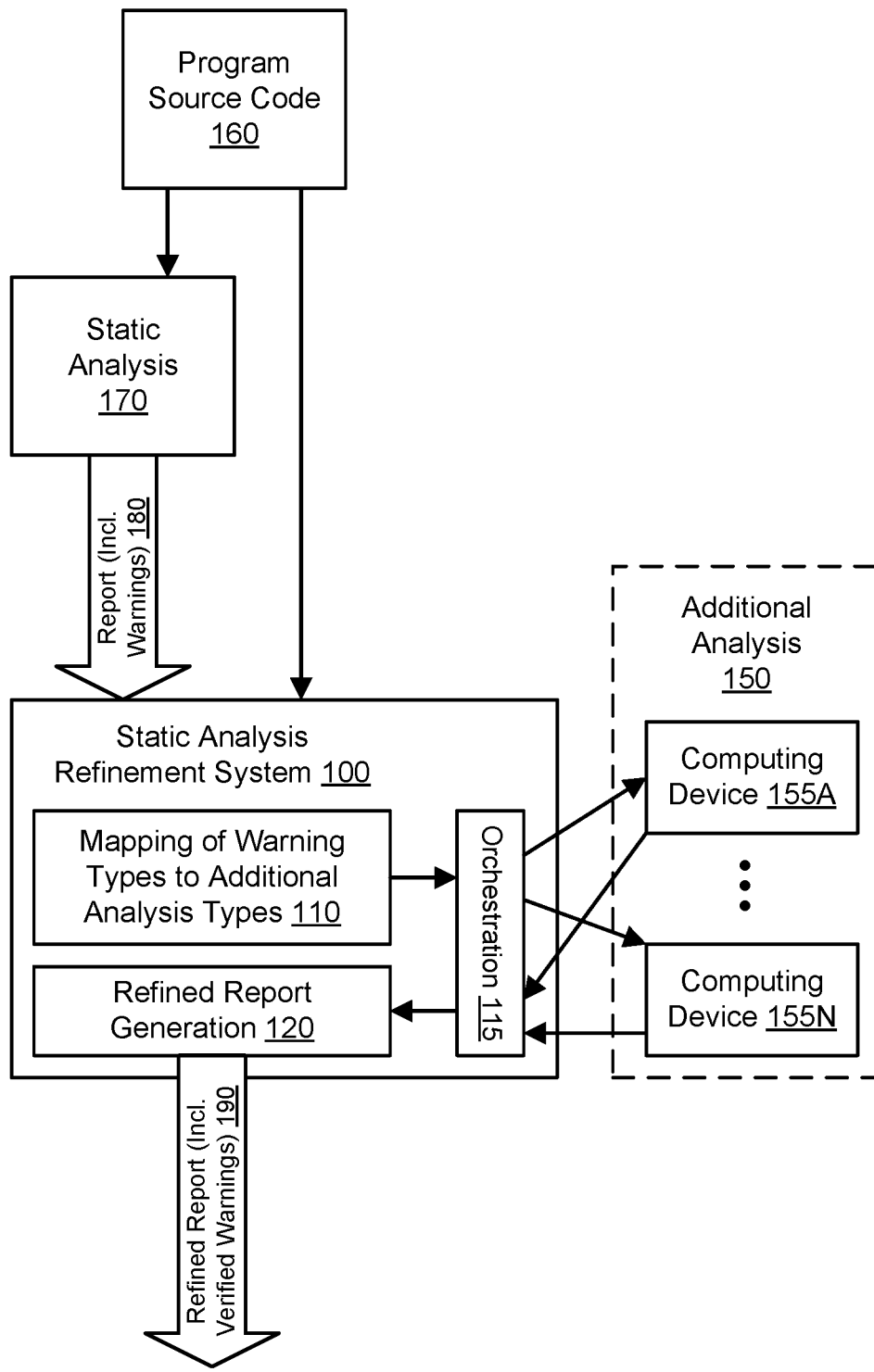

In one embodiment, the additional analysis tools of the various types may be performed or invoked serially, e.g., using one computing device. In one embodiment, the additional analysis tools of the various types may be performed or invoked in parallel due to the independence of the additional analysis 150 for individual warnings. As shown in the example of FIG. 1D, the tools for additional analysis 150 may be implemented on various computing devices 155A-155N of a distributed system. Although two computing devices 155A and 155N are shown for purposes of illustration and example, any suitable number and configuration of computing devices may be used with the static analysis refinement system 100. The various computing devices may operate on different warnings in parallel to generate the refined report 190 more quickly. The static analysis refinement system 100 may include an orchestration component 115 that assigns and distributes additional analysis tasks to the computing devices 155A-155N. The orchestration component 115 may also receive and aggregate the results of the additional analysis 150 for use in generating the refined report 190.

In one embodiment, the orchestration component 115 assigns an identifier to each analysis job and places the job (tagged with the identifier) in a work queue that is accessible by the computing devices 155A-155N. Each job identifier may associate an analysis job with a warning in the original report. The computing devices 155A-155N may represent worker nodes that can check the work queue for newly added analysis jobs. In some embodiments, a worker node may select jobs from the queue based (at least in part) on the type of analysis that the worker node is configured to perform, on the capabilities of the worker node (e.g., its computational and memory resources), on the current availability of the worker node, and so on. In one embodiment, the analysis jobs may be distributed to the worker nodes using load-balancing techniques, with some jobs being performed in a parallel and distributed manner on different worker nodes. A worker node may perform an analysis job, determine a result of the analysis job, and store the result in a data store or send a message with the result (e.g., to the orchestration component 115). For example, the result of one analysis job may indicate that the warning is a false positive, a true positive, or of unknown status. The static analysis refinement system 100 may include a component (e.g., the orchestration component 115 or refined report generation 120) that checks the data store for results of the analysis jobs or receives the result messages, extracts the results, generates annotations based on the results, and adds the annotations to the refined report 190. The component may use the job identifiers to link analysis results to warnings in the original report. In one embodiment, the refinement may be performed using another worker node that refines the report based on the results generated by the other worker nodes.

Figure 8:
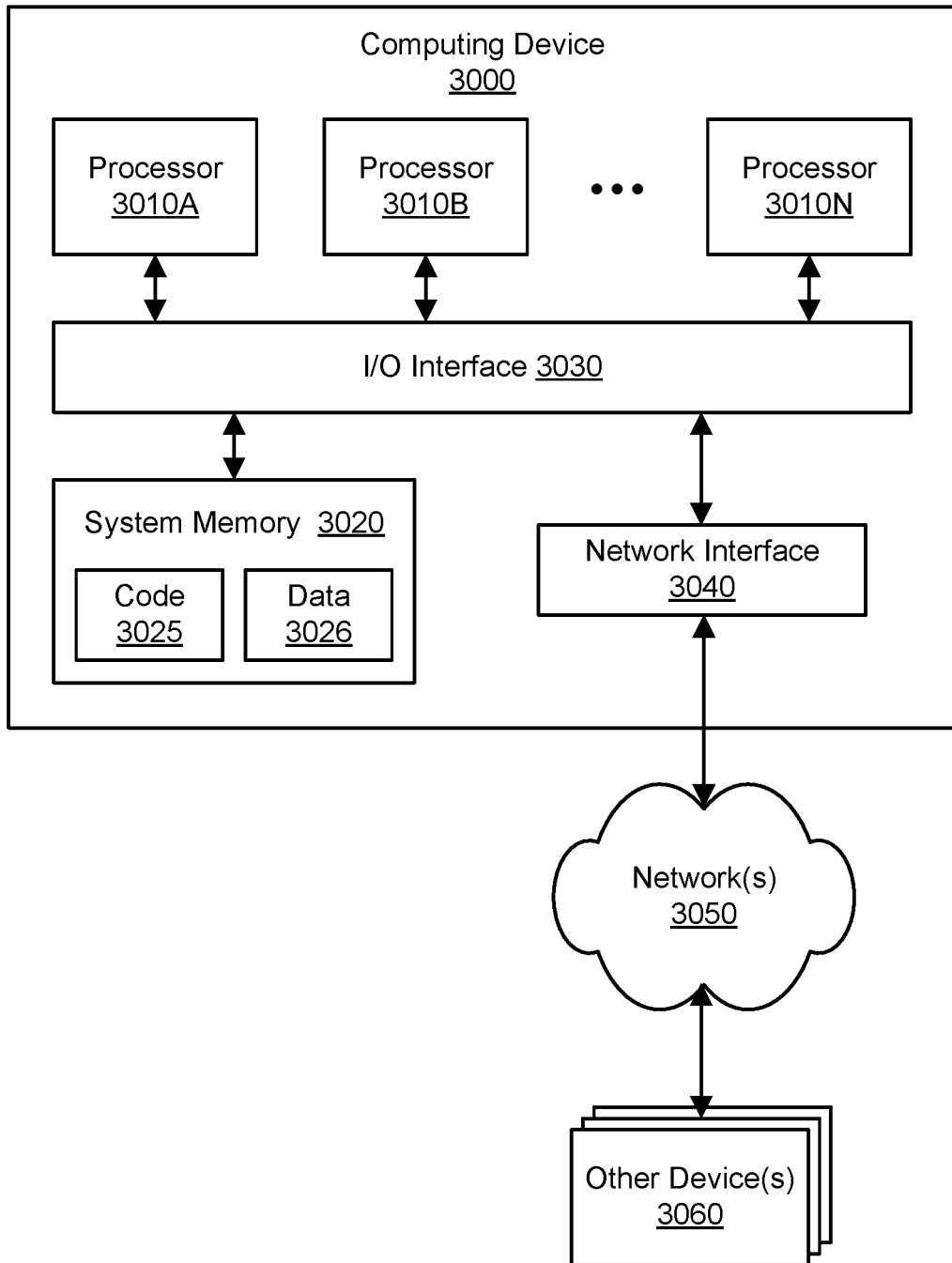
FIG. 8 illustrates an example computing device that may be used in some embodiments.

The computing devices 155A-155N may be implemented by the example computing device 3000 illustrated in FIG. 8. The computing devices 155A-155N may communicate with the orchestration component 115 using one or more network connections or other interconnects. The computing devices 155A-155N may be located in any suitable location relative to the static analysis refinement system 100, e.g., in the same rack, in the same data center, or in different data centers. In one embodiment, the computing devices 155A-155N may represent virtual compute instances that can be provisioned and deprovisioned as needed for use with the system 100. Each of the computing devices 155A-155N may implement one type of additional analysis 150 or more than one type of additional analysis. The computing devices 155A-155N may be heterogeneous or homogeneous in terms of processor resources, memory resources, network resources, and so on. In one embodiment, analyses of particular warning types may be assigned to individual computing devices 155A-155N based (at least in part) on the capabilities and resources of the computing devices, e.g., such that more challenging analysis tasks are assigned to more capable computing devices. The orchestration component 115 may contain sufficient intelligence to assign analysis of particular warnings to particular computing devices, e.g., based on machine learning techniques that determine and use execution statistics (e.g., execution duration) for various types of analysis on various configurations of computing devices 155A-155N. The orchestration component 115 may use any suitable scheduling technique to assign tasks to the computing devices 155A-155N, e.g., using a round-robin scheduling algorithm.

The static analysis refinement system 100 may include a plurality of computing devices, any of which may be implemented by the example computing device 3000 illustrated in FIG. 8. In various embodiments, portions of the described functionality of the static analysis refinement system 100 may be provided by the same computing device or by any suitable number of different computing devices. If any of the components of the static analysis refinement system 100 are implemented using different computing devices, then the components and their respective computing devices may be communicatively coupled, e.g., via a network. Each of the illustrated components (such as the static analysis 170, mapping 110, refined report generation 120, and/or additional analysis 150) may represent any combination of software and hardware usable to perform their respective functions. It is contemplated that the static analysis refinement system 100 may include additional components not shown, fewer components than shown, or different combinations, configurations, or quantities of the components shown. For example, although various additional analysis tools 150A-150N are shown for purposes of example and illustration, it is contemplated that different quantities and configurations of additional analysis tools or techniques may be used. Aspects of the functionality described herein may be performed, at least in part, by components outside of the static analysis refinement system 100.

Figure 2:
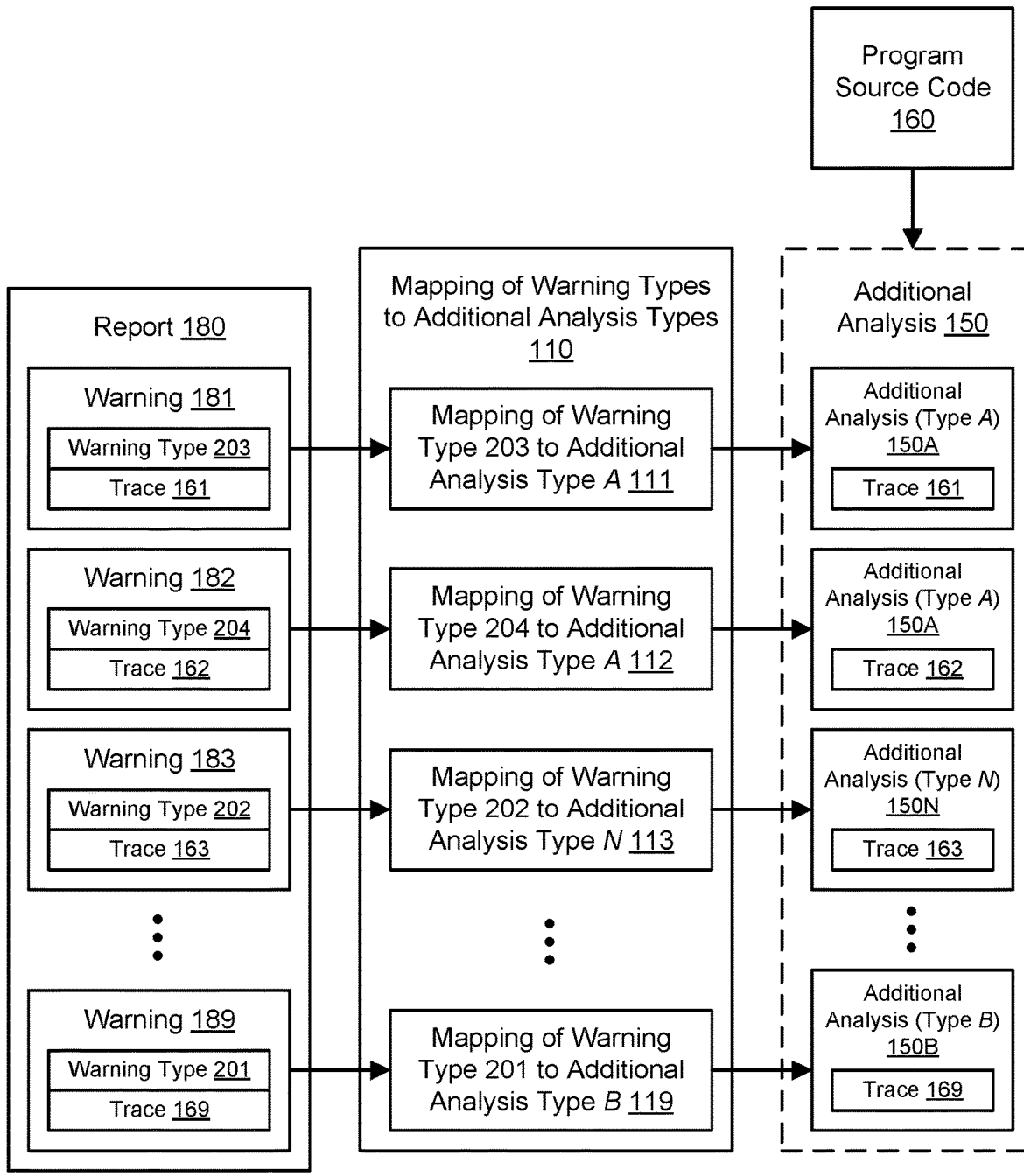
FIG. 2 illustrates further aspects of the example system for refinement of static analysis of program code, including a mapping between individual warnings and additional analysis tools for refinement, according to one embodiment.

FIG. 2 illustrates further aspects of the example system for refinement of static analysis of program code, including a mapping between individual warnings and additional analysis tools for refinement, according to one embodiment. In one embodiment, individual warnings in the initial report 180 may be associated with warning types. In one embodiment, the warning types may include human-readable descriptions of potential errors, flaws, security vulnerabilities, and so on. In one embodiment, the warning types may include alphanumeric codes that represent categories of potential errors, flaws, security vulnerabilities, and so on. The warning types may vary based on the identity of the static code analysis tool that produced the initial report. As shown in the example of FIG. 2, the report 180 may include a warning 181 of warning type 203, a warning 182 of warning type 204, a warning 183 of warning type 202, numerous other warnings (not shown) of the same or different warning types, and finally a warning 189 of warning type 201.

The static analysis refinement system 100 may perform, invoke, or initiate a particular type of additional analysis 150 for at least some of the warnings. The type of additional analysis may vary based (at least in part) on the warning type of the warning. As discussed above, the static analysis refinement system 100 may use a mapping component 110 to map warning types to types of the additional analysis 150. As shown in the example of FIG. 2, one mapping 111 may associate warning type 203 with additional analysis (type A), another mapping 112 may associate a different warning type 204 with the same type of additional analysis (type A), yet another mapping 113 may associate warning type 202 with additional analysis (type N), and another mapping 119 may associate warning type 201 with additional analysis (type B). The static analysis refinement system 100 may also implement other mappings of particular warning types to particular types of additional analysis 150. In one embodiment, the system 100 may invoke a relatively small number of additional analysis types for a much larger number of warning types, and so more than one of the warning types may map to the same type of additional analysis.

The static analysis 170 may generate a trace for an individual warning. The trace may indicate one or more segments of the source code 160 that are associated with the warning, e.g., that may contain an error, flaw, vulnerability, or other potential problem. In one embodiment, a particular trace may include the names of any build artifacts and the line numbers or other indicators of segment boundaries within those build artifacts. As shown in the example of FIG. 2, the warning 181 may be associated with trace 161, the warning 182 may be associated with trace 162, the warning 183 may be associated with trace 163, and the warning 189 may be associated with trace 169. The additional analysis 150 performed or invoked for a particular warning may be performed on the trace associated with the warning. In one embodiment, the additional analysis 150 may obtain the relevant segment(s) of the source code 160, either directly or as input from the static analysis refinement system 100. As shown in the example of FIG. 2, the static analysis refinement system 100 may perform or invoke additional analysis (type A) 150A for the segment(s) of code associated with the trace 161, additional analysis (type A) 150A for the segment(s) of code associated with the trace 162, additional analysis (type N) 150N for the segment(s) of code associated with the trace 163, and additional analysis (type B) 150B for the segment(s) of code associated with the trace 169. As discussed above, the additional analysis tools of the various types may be performed or invoked in serial or in parallel, e.g., using a distributed system to operate on different warnings in parallel to generate the refined report 190 more quickly.

In one embodiment, a particular warning type may map to a single type of additional analysis 150; the result of the additional analysis may dictate whether the particular warning is determined to be a true positive (a verified warning, verified error, or verified flaw), a false positive (a verified non-error or non-flaw), or a warning of unknown status. In one embodiment, a particular warning type may map to multiple types of additional analysis 150; the multiple types of additional analysis may be performed in serial or in parallel and may vote towards a single determination as to whether the particular warning is a true positive (a verified warning, verified error, or verified flaw), a false positive (a verified non-error or non-flaw), or a warning of unknown status. In one embodiment, the additional analysis 150 may include one or more static analysis tools or techniques that may examine one or more segments of the program source code 160 without necessarily executing the corresponding program. In one embodiment, the additional analysis 150 may include one or more dynamic analysis tools or techniques that may be performed based (at least in part) on execution of one or more programs corresponding to one or more segments of the program source code 160.

In some embodiments, additional analysis 150 using regular-expression pattern matching (e.g., using the grep tool) may be performed, invoked, or initiated for the following warning types: "uninitialized variable" and/or "poor style (value never read)." The regular-expression pattern matching may determine whether the warning represents a true positive (a verified warning, verified error, or verified flaw), a false positive (a verified non-error or non-flaw), or a warning of unknown status. The static analysis refinement system 100 may perform the pattern matching internally or may instead invoke an external tool or utility such as grep.

In some embodiments, additional analysis 150 using data flow analysis may be performed, invoked, or initiated for the following warning types: "dead code (empty try block)," "dead code (expression is always false)," "dead code (expression is always true)," "dead code (unused field)," "dead code (unused method)," and/or "command injection." The data flow analysis may determine whether the warning represents a true positive (a verified warning, verified error, or verified flaw), a false positive (a verified non-error or non-flaw), or a warning of unknown status. The static analysis refinement system 100 may perform the data flow analysis internally or may instead invoke an external tool or utility (e.g., an open source program) such as goto-analyzer to determine unreachable instructions or taint (e.g., a variable that can be modified by an outside user). Data flow analysis may be too expensive (e.g., in terms of processor and memory resources) to perform for an entire set of program source code but may be used feasibly for individual segments of program code corresponding to warnings.

In some embodiments, additional analysis 150 using model checking may be performed, invoked, or initiated for the following warning types: "integer overflow," "memory leak," "memory leak (reallocation)," "buffer overflow," "buffer overflow (format string)," "buffer overflow (off-by-one)," "buffer overflow (signed comparison)," "double free," "heap inspection," "illegal pointer value," "missing check against null," "null dereference," "out-of-bounds read," "out-of-bounds read (off-by-one)," "out-of-bounds read (signed comparison)," "string termination error," and/or "use after free." The model checking may determine whether the warning represents a true positive (a verified warning, verified error, or verified flaw), a false positive (a verified non-error or non-flaw), or a warning of unknown status. The static analysis refinement system 100 may perform the model checking internally or may instead invoke an external tool or utility (e.g., an open source program) such as cbmc to perform a signed overflow check, a conversion check, a memory leak check, a pointer check, a bounds check, and so on. The cbmc tool may perform bounded model checking, e.g., for C/C++ and Java programs. The cbmc tool may generate traces that demonstrate how an assertion can be violated or may prove that the assertion cannot be violated within a given number of loop iterations. Using cbmc to perform model checking, the verification may be performed by unwinding the loops in the source code and passing the resulting equation to a decision procedure. Model checking may be too expensive (e.g., in terms of processor and memory resources) to perform for an entire set of program source code but may be used feasibly for individual segments of program code (e.g., traces) corresponding to warnings.

In some embodiments, additional analysis 150 using syntactic checking may be performed, invoked, or initiated for the following warning types: "build misconfiguration: external ant dependency repository," "build misconfiguration: external maven dependency repository," "code correctness (erroneous string compare)," "code correctness (function not invoked)," "code correctness (memory free on stack variable)," "code correctness: call to system.gc( )" "code correctness: call to thread.run( )" "code correctness: call to notify( )" "code correctness: call to sleep( ) in lock," "code correctness: class does not implement cloneable," "code correctness: class does not implement equals," "code correctness: double-checked locking," "code correctness: erroneous class compare," "code correctness: erroneous string compare," "code correctness: erroneous finalize( ) method," "code correctness: misleading method signature," "code correctness: multiple stream commits," "code correctness: non-synchronized method overrides synchronized method," "code correctness: regular expressions denial of service," "code correctness: null argument to equals( )" "code correctness: toString on array," "dangerous function (strcpy( ))," "format string (argument type mismatch)," "insecure compiler optimization (pointer arithmetic)," "insecure compiler optimization," "insecure randomness (hardcoded seed)," "insecure randomness (weak entropy source)," "insecure randomness," "insecure temporary file," "key management (hardcoded encryption key)," "obsolete," "often misused (authentication)," "often misused (file system)," "often misused (privilege management)," "password management (hardcoded password)," "password management (password in comment)," "poor error handling (empty catch block)," "poor error handling (overly broad catch)," "poor error handling (overly broad throws)," "poor error handling (program catches nullpointerexception)," "poor error handling (return inside finally)," "poor error handling (throw inside finally)," "poor error handling (unhandled ssl exception)," "poor logging practice (logger not declared static final)," "poor logging practice (multiple loggers)," "poor logging practice (use of a system output stream)," "poor style (redundant initialization)," "poor style (variable never used)," "poor style: confusing naming," "poor style: identifier contains dollar symbol ($)," "poor style: non-final public static field," "portability flaw," "portability flaw: file separator," "type mismatch (integer to character)," "type mismatch (negative to unsigned)," "type mismatch (signed to unsigned)," and/or "unchecked return value." The syntactic checking may determine whether the warning represents a true positive (a verified warning, verified error, or verified flaw), a false positive (a verified non-error or non-flaw), or a warning of unknown status. The static analysis refinement system 100 may perform the syntactic checking internally or may instead invoke an external tool or utility.

In some embodiments, additional analysis 150 may be performed internally by the static analysis refinement system 100 for the following warning types: "code correctness (memory free on stack variable (infeasible))," "memory leak ((infeasible))," and/or "uninitialized variable ((infeasible))." The internal analysis may determine whether the warning represents a true positive (a verified warning, verified error, or verified flaw), a false positive (a verified non-error or non-flaw), or a warning of unknown status. It is contemplated that similar analysis of the listed warning types may be invoked using a tool external to the static analysis refinement system 100.

Figure 3A:
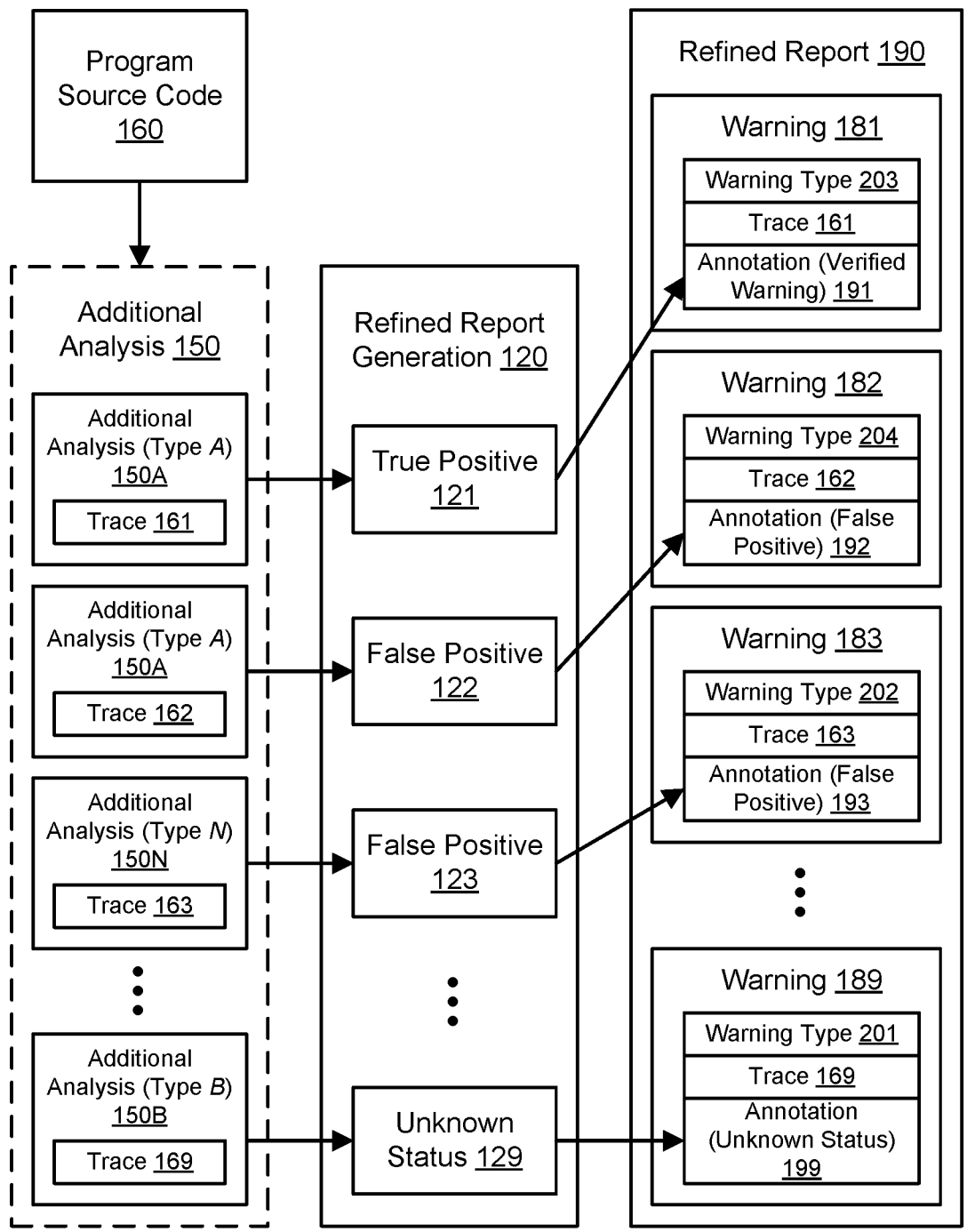
FIG. 3A and FIG. 3B illustrate further aspects of the example system for refinement of static analysis of program code, including generation of a refined report based on additional analysis of individual warnings, according to one embodiment.
Figure 3B:
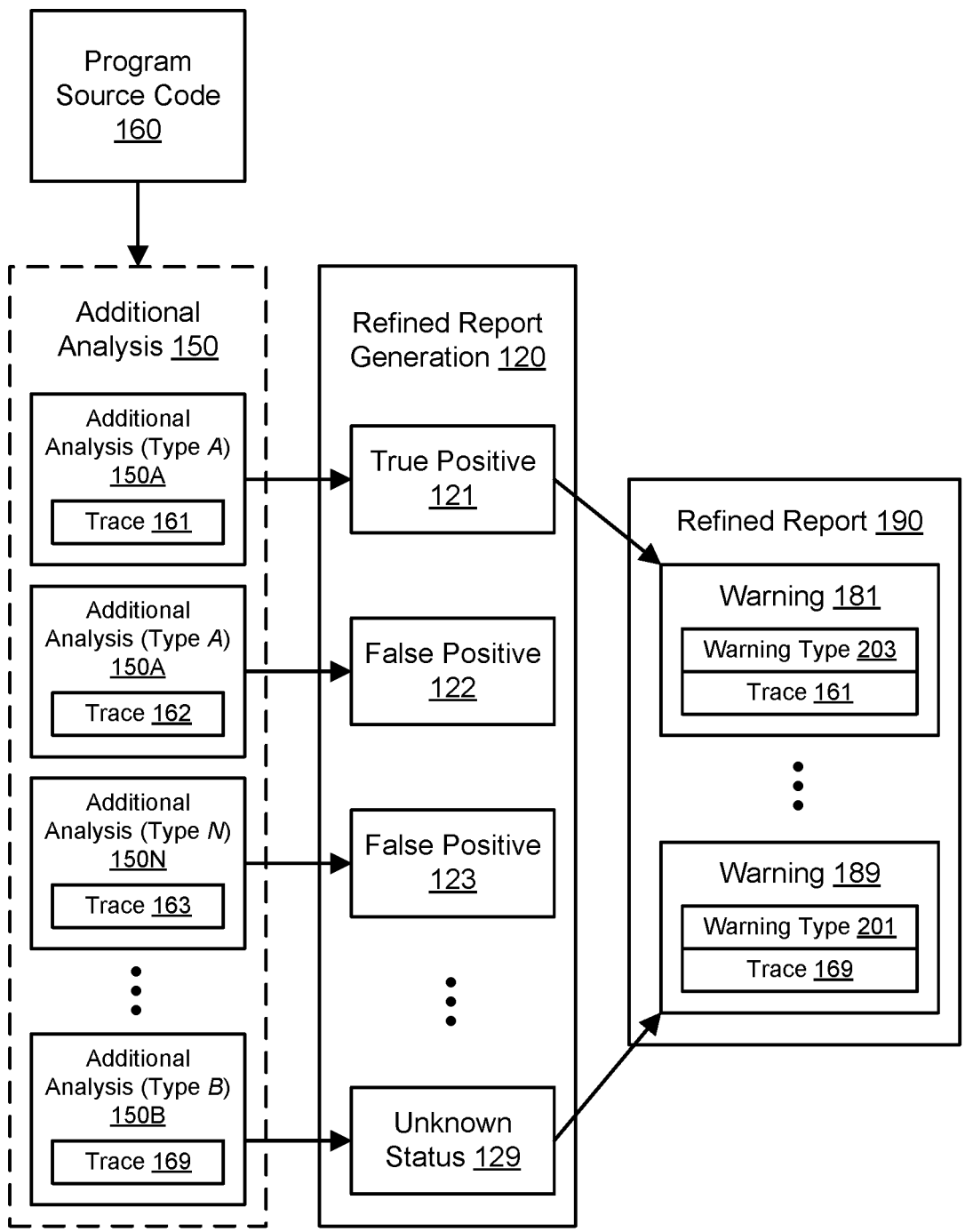

FIG. 3A and FIG. 3B illustrate further aspects of the example system for refinement of static analysis of program code, including generation of a refined report based on additional analysis of individual warnings, according to one embodiment. As shown in the example of FIG. 3A, the additional analysis (type A) 150A performed on trace 161 has determined that the corresponding warning 181 is a true positive 121 in that it represents a genuine error, flaw, vulnerability, or other problem. In one embodiment, the component 120 for refined report generation may include the warning 181 in the refined report 190 with an annotation 191 that indicates its status as a verified warning. However, the additional analysis (type A) 150A performed on trace 162 has determined that the corresponding warning 182 is a false positive 122 in that it does not represent a genuine error, flaw, vulnerability, or other problem. In one embodiment, the component 120 for refined report generation may include the warning 182 in the refined report 190 with an annotation 192 that indicates its status as a false positive. Similarly, the additional analysis (type N) 150N performed on trace 163 has determined that the corresponding warning 183 is a false positive 123, and the refined report 190 may include an annotation 193 that indicates its status as a false positive. Additionally, as shown in the example of FIG. 3A, the additional analysis (type B) 150B performed on trace 169 has failed to determine whether the corresponding warning 189 is a true positive or a false positive and is instead a warning of unknown status 129. In one embodiment, the component 120 for refined report generation may include the warning 189 in the refined report 190 with an annotation 199 that indicates its unknown status regarding verification. To generate the refined report 190, the annotations 191-199 may be included in a comment field in the original report 180. As shown in the example of FIG. 3B, rather than including both true positives and false positives with corresponding annotations, the refined report 190 may exclude the false positives such as warnings 182 and 183. In one embodiment, as shown in FIG. 3B, the refined report 190 may include only true positives such as warning 181 and warnings of unknown verification status such as warning 189.

Figure 4:
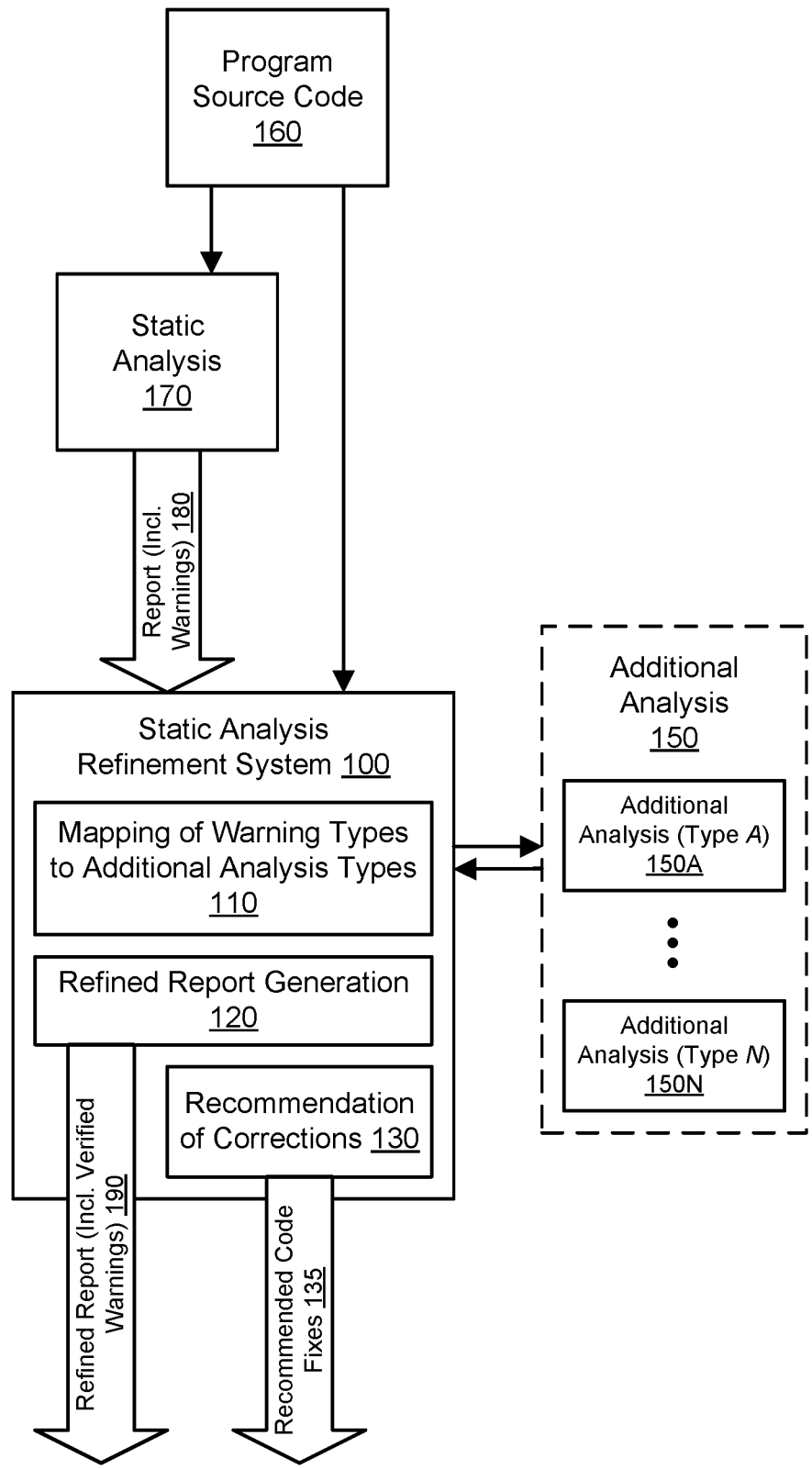
FIG. 4 illustrates further aspects of the example system for refinement of static analysis of program code, including generation of recommendations for fixes of verified warnings, according to one embodiment.

FIG. 4 illustrates further aspects of the example system for refinement of static analysis of program code, including generation of recommendations for fixes of verified warnings, according to one embodiment. Based (at least in part) on verifying an individual warning using additional analysis, the static analysis refinement system 100 may automatically generate a correction for the problem underlying the warning. As shown in FIG. 4, the static analysis refinement system 100 may include a component 130 for recommendation of corrections. In one embodiment, one or more code fixes 135 may be presented to a user as a recommendation, e.g., via a user interface. In one embodiment, the user may enter the fix(es) 135 manually to modify the program source code. In one embodiment, the static analysis refinement system 100 may enter the fix(es) 135 to modify the program source code, e.g., based on user input representing acceptance of the recommendation. In some embodiments, corrected source code may be recommended by the static analysis refinement system 100 for the following warning types, if verified as true positives: "uninitialized variable," "poor style (value never read)," and/or "poor style (variable never used)."

Figure 5:
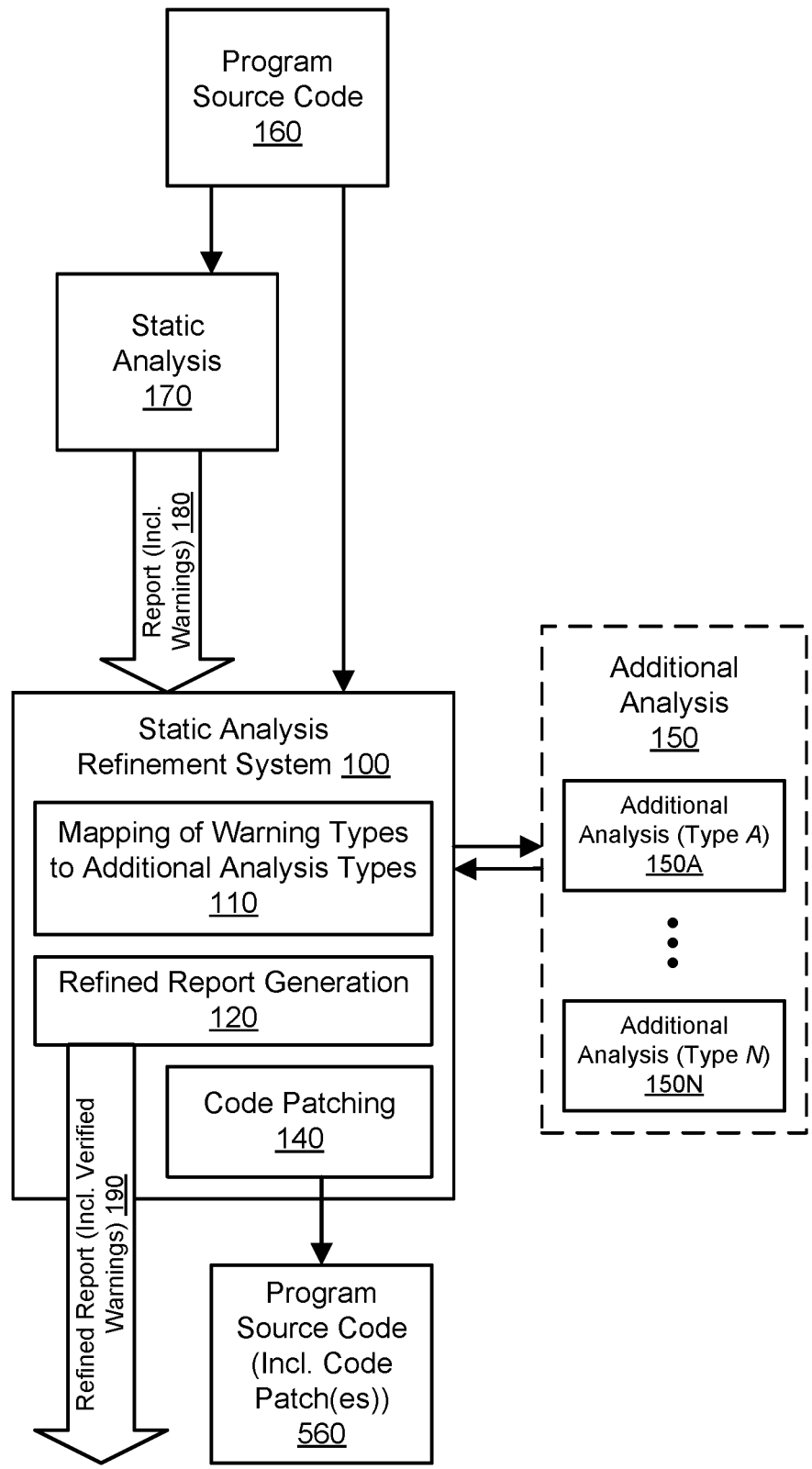
FIG. 5 illustrates further aspects of the example system for refinement of static analysis of program code, including generation of code patches to fix verified warnings, according to one embodiment.

FIG. 5 illustrates further aspects of the example system for refinement of static analysis of program code, including generation of code patches to fix verified warnings, according to one embodiment. Based (at least in part) on verifying an individual warning using additional analysis, the static analysis refinement system 100 may automatically generate program source code 560 that corrects the problem underlying the warning. As shown in FIG. 5, the static analysis refinement system 100 may include a component 140 for automated code patching. In one embodiment, the correction(s) to the source code may be presented to a user as a suggestion, e.g., via a user interface, and user input may be solicited to accept or reject the recommendation. In one embodiment, the static analysis refinement system 100 may automatically generate one or more code patches that corrects one or more problems and may then replace the problematic segment(s) of code with the code patch(es), e.g., without user input accepting or rejecting the code patch(es). In one embodiment, the system 100 may thus generate modified program source code 560 that includes one or more code patches to the original code 160. In some embodiments, corrected source code may be generated by the static analysis refinement system 100 for the following warning types, if verified as true positives: "uninitialized variable," "poor style (value never read)," and/or "poor style (variable never used)."

Figure 6:
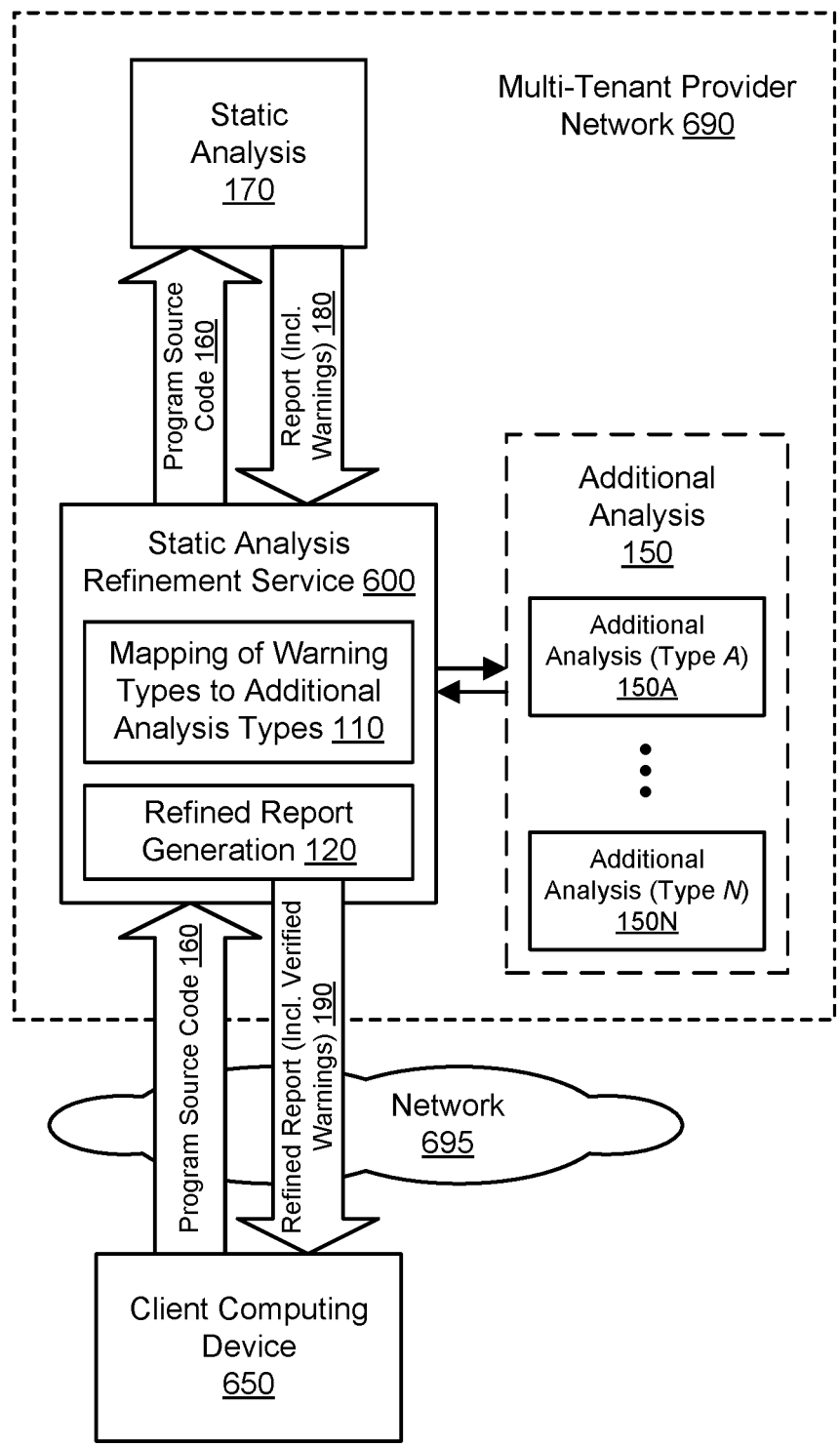
FIG. 6 illustrates further aspects of the example system for refinement of static analysis of program code, including offering the static analysis refinement as a service of a multi-tenant provider network, according to one embodiment.

FIG. 6 illustrates further aspects of the example system for refinement of static analysis of program code, including offering the static analysis refinement as a service of a multi-tenant provider network, according to one embodiment. In one embodiment, the static analysis refinement techniques discussed herein may be implemented using a static analysis refinement service 600. The static analysis refinement service 600 may be offered to a plurality of clients by a provider network 690. As shown in the example of FIG. 6, a particular client computing device 650 may submit program source code 160 (or a link thereto, e.g., in a network-accessible repository) to the service 600. The service 600 may offer a suitable interface to enable the client 650 to submit the source code 160. The interface may include an application programming interface (API), web-accessible user interface, other user interface, or other programmatic interface. The service 600 may then invoke the static analysis 170 and pass the source code (or the link thereto) to the static analysis. Upon generating the refined report 190, the service 600 may send the report back to the client 650.

The static analysis refinement service 600 may include a plurality of computing devices, any of which may be implemented by the example computing device 3000 illustrated in FIG. 8. For example, multiple instances of the service 600 may be executed using multiple computing devices, and each instance may provide static analysis refinement for one or more clients simultaneously. In various embodiments, portions of the described functionality of the static analysis refinement service 600 may be provided by the same computing device or by any suitable number of different computing devices. If any of the components of the static analysis refinement service 600 are implemented using different computing devices, then the components and their respective computing devices may be communicatively coupled, e.g., via a network. It is contemplated that the static analysis refinement service 600 may include additional components not shown, fewer components than shown, or different combinations, configurations, or quantities of the components shown. Aspects of the functionality described herein may be performed, at least in part, by components outside of the static analysis refinement service 600 and/or outside the provider network 690.

The provider network 690 may be set up by an entity such as a business organization or a public-sector organization to provide one or more services (such as various types of cloud-based computing or storage) to a set of clients via the Internet and/or other networks. The provider network 690 may include numerous data centers hosting various resource pools, such as collections of physical and/or virtualized computer servers, storage devices, networking equipment and the like (e.g., implemented using computing system 3000 described below with regard to FIG. 8), that may be used to implement and distribute the infrastructure and services offered by the provider network. In some embodiments, the provider network 690 may provide computing resources, such as a set of compute instances that can be provisioned on behalf of clients of the provider network and then used by those clients. The computing resources may include virtual compute instances that are implemented by one or more network-accessible compute virtualization services. In some embodiments, the provider network 690 may provide storage resources, such as a set of storage instances that can be provisioned on behalf of clients of the provider network and then used by those clients. The storage resources may be implemented by one or more network-accessible storage services, such as a block-based storage service, key-value based data stores, or various types of database systems.

The provider network 690 may include numerous network-based services, such as the static analysis refinement service 600, that interact to offer resources to clients. Client devices may access these various services offered by the provider network 690 via one or more networks such as network 695. Likewise, network-based services of the provider network 690 may themselves communicate and/or make use of one another to provide different services. For example, computing resources offered to clients in units called "instances," such as virtual or physical compute instances, may make use of particular data volumes, thus providing virtual block storage for the compute instances. The provider network 690 may implement or provide a multi-tenant environment such that multiple clients (e.g., using client devices outside the provider network) may access or use a particular resource or service, such as the service 600, in a substantially simultaneous manner. The provider network 690 may thus represent a multi-tenant provider network. The clients, users, or customers of the provider network 690 may represent persons, businesses, other organizations, and/or other entities. The client devices associated with clients may be distributed over any suitable locations or regions.

Client devices such as device 650 may convey network-based service requests to the provider network 690 via one or more external network(s) 695. In various embodiments, the external network(s) 695 may encompass any suitable combination of networking hardware and protocols necessary to establish network-based communications between client devices and the provider network 690. For example, the network(s) 695 may generally encompass the various telecommunications networks and service providers that collectively implement the Internet. The network(s) 695 may also include private networks such as local area networks (LANs) or wide area networks (WANs) as well as public or private wireless networks. For example, both a given client device and the provider network 690 may be respectively provisioned within enterprises having their own internal networks. In such an embodiment, the network(s) 695 may include the hardware (e.g., modems, routers, switches, load balancers, proxy servers, etc.) and software (e.g., protocol stacks, accounting software, firewall/security software, etc.) necessary to establish a networking link between the given client device 650 and the Internet as well as between the Internet and the provider network 690. It is noted that in some embodiments, client devices may communicate with provider network 690 using a private network rather than the public Internet.

The provider network 690 may include a plurality of computing devices, any of which may be implemented by the example computing device 3000 illustrated in FIG. 8. The client computing device 650 may also be implemented by the example computing device 3000 illustrated in FIG. 8. In various embodiments, portions of the described functionality of the provider network 690 may be provided by the same computing device or by any suitable number of different computing devices. If any of the components of the provider network 690 are implemented using different computing devices, then the components and their respective computing devices may be communicatively coupled, e.g., via a network. Each of the illustrated components (such as the service 600) may represent any combination of software and hardware usable to perform their respective functions.

Figure 7:
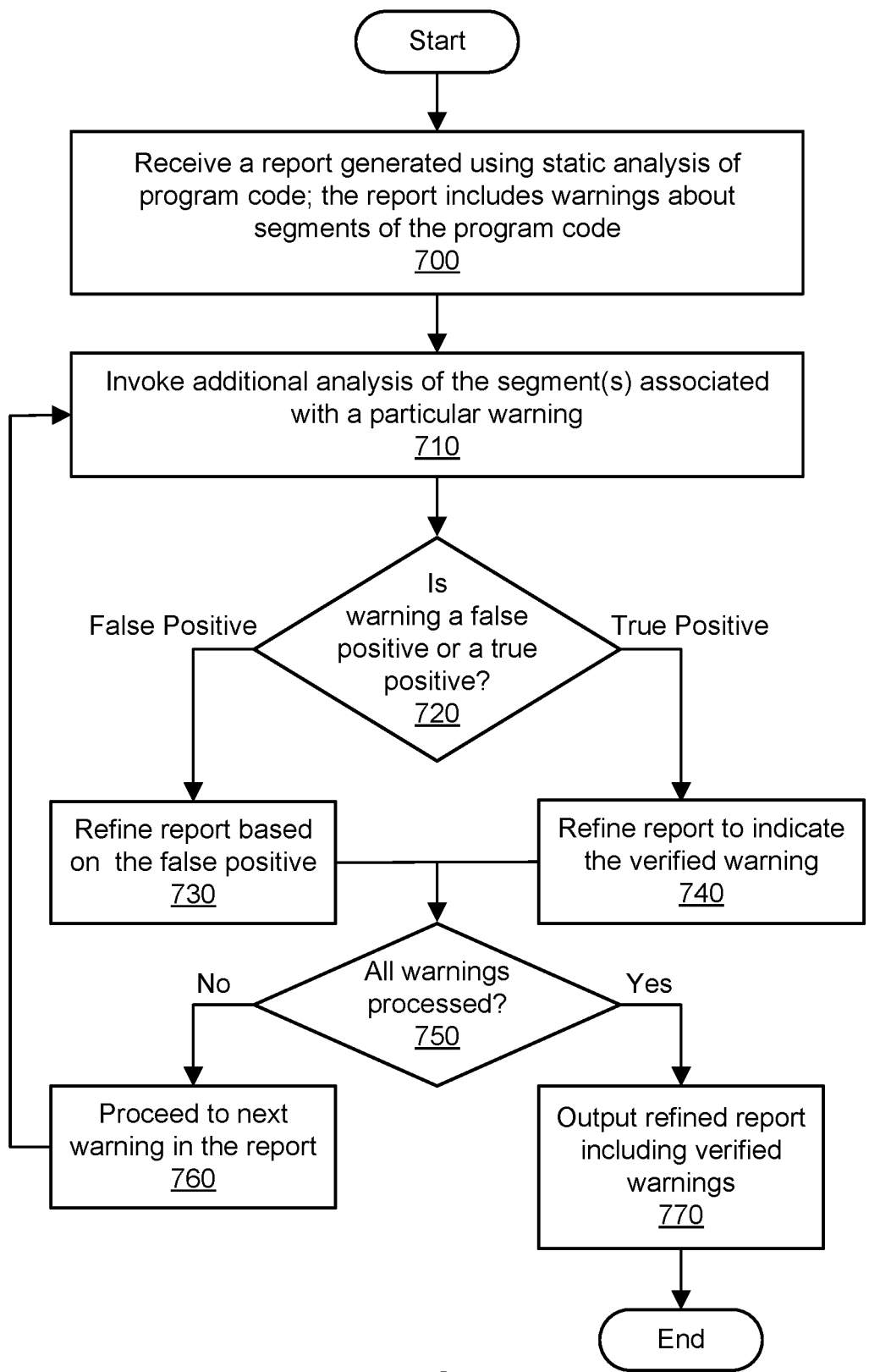
FIG. 7 is a flowchart illustrating a method for refinement of static analysis of program code, according to one embodiment.

FIG. 7 is a flowchart illustrating a method for refinement of static analysis of program code, according to one embodiment. As shown in 700, a report may be received that includes warnings regarding particular segments of program source code. In one embodiment, the report was generated using static analysis of the program code. The warnings may represent potential or supposed errors, flaws, vulnerabilities, and other problematic constructs or elements. The static analysis tool may operate by instrumenting the source code and looking for programming constructs that are known to be the cause of common programming or security mistakes. In many cases, however, the report may include numerous false positives, e.g., warnings that do not represent genuine errors, flaws, or vulnerabilities. The report may also include true positives, e.g., warnings that do indeed represent genuine errors, flaws, or vulnerabilities.

As shown in the example of FIG. 7, the warnings may be processed serially to attempt to determine whether they represent true positives or false positives. As shown in 710, additional analysis may be invoked for the one or more segments of the program code that correspond to a particular warning. One or more of the additional analysis techniques used for a particular warning may vary based (at least in part) on the type of warning, as indicated in the report. For example, some warning types may be subjected to additional analysis using model checking, while other warning types may be subjected to data flow analysis, and yet other warning types may be subjected to syntactic checking. As described above, in some cases the analysis on each segment may be done in parallel on different computing devices or virtual machines.

As shown in 720, it may be determined whether the warning represents a false positive or a true positive. In one embodiment, false positives may be identified with some degree of certainty while identification of true positives may have a lesser degree of certainty. If the warning is deemed to be a false positive, then as shown in 730, the original report may be refined based on the finding that the warning is a false positive. Refinement of the original report for a false positive may include annotating the warning to indicate its status as a false positive or excluding the warning from the refined report entirely. If the warning is deemed to be a true positive, then as shown in 740, the original report may be refined based on the finding that the warning is a true positive. Refinement of the original report for a true positive may include annotating the warning to indicate its status as a true positive. For example, the computing device performing the additional analysis can generate a message indicating that the warning is a false positive or true positive and store the information in a data store.

As shown in 750, it may be determined whether all the warnings in the original report have been processed, e.g., by attempting additional analysis. If not, then as shown in 760, the method may proceed to the next warning in the report. If so, then as shown in 770, the method may output a refined report that includes verified warnings (true positives) and excludes or annotates warnings found to be false positives. If a warning cannot be determined to be either a true positive or a false positive, then the warning may be included in the refined report, potentially with an annotation indicating its unknown verification status. For example, static analysis refinement system 100 can include a program that checks the data store for results from the additional analysis; extracts the additional analysis; generates annotations; and adds them to the report.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-

3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
at least one processor and a memory storing program instructions executable by the at least one processor to:
receive an initial report generated using initial static analysis of program code, wherein the initial report comprises a plurality of warnings regarding the program code, wherein at least some of the warnings represent potential flaws in the program code, and wherein the plurality of warnings are associated with a plurality of segments of the program code;
determine a plurality of analysis techniques to at least detect false positives for at least some of the plurality of warnings according to a mapping between different types of warnings and individual analysis techniques of the plurality of analysis techniques to at least detect false positives;
perform additional analysis of at least some of the plurality of segments of the program code using the determined plurality of analysis techniques to at least detect false positives, wherein different analysis techniques to at least detect false positives of the determined plurality of analysis techniques to at least detect false positives are performed for different segments of the at least some of the plurality of segments of the program code based on a type of warning for each of the different segments, and wherein the additional analysis differs at least in part from the initial static analysis;
based at least in part on the additional analysis, determine that one subset of the plurality of warnings represents false positives and another subset of the plurality of warnings represents true positives;
generate a refined report indicating a plurality of verified warnings regarding the program code, wherein the plurality of verified warnings include the true positives and do not include the false positives; and
generate modified program coda that eliminates at least some of the verified warnings.

2. The system as recited in claim 1, wherein the additional analysis that differs at least in part from the initial static analysis is additional static analysis, and wherein the additional static analysis differs for one or more of the segments of the program code based at least in part on the different types of warnings.

3. The system as recited in claim 1, wherein the program instructions are further executable by the at least one processor to:
generate one or more recommendations for program code modifications eliminating at least some of the verified warnings.

4. A computer-implemented method, comprising:
receiving a report generated using initial static analysis of program code, wherein the report comprises a plurality of warnings regarding the program code, wherein at least some of the warnings represent potential flaws in the program code, and wherein the plurality of warnings are associated with a plurality of segments of the program code;
determining a plurality of analysis techniques to at least detect false positives for at least some of the plurality of warnings according to a mapping between different types of warnings and individual analysis techniques of the plurality of analysis techniques to at least detect false positives;
performing additional analysis of at least some of the plurality of segments of the program code using the determined plurality of analysis techniques to at least detect false positives, wherein different analysis techniques to at least detect false positives of the determined plurality of analysis techniques to at least detect false positives are performed for different segments of the at least some of the plurality of segments of the program code based on a type of warning for each of the different segments of the program code, wherein the additional analysis differs at least in part from the initial static analysis, and wherein the additional analysis comprises dynamic analysis for at least one of the at least some of the plurality of segments of the program code;
based at least in part on the additional analysis, determining that at least some of the plurality of warnings represent false positives and determining that at least some of the plurality of warnings represent true positives; and
generating a second report indicating a plurality of verified warnings regarding the program code, wherein the plurality of verified warnings include the true positives and do not include the false positives.

5. The method as recited in claim 4, wherein the additional analysis comprises static analysis for at least some of the plurality of segments of the program code.

6. The method as recited in claim 4, further comprising:
generating one or more recommendations for program code modifications eliminating at least some of the verified warnings.

7. The method as recited in claim 4, wherein the additional analysis differs for one or more of the segments of the program code based at least in part on the different types of warnings.

8. The method as recited in claim 4, wherein the additional analysis comprises model checking for at least some of the plurality of segments of the program code.

9. The method as recited in claim 4, wherein the additional analysis comprises data flow analysis for at least some of the plurality of segments of the program code.

10. The method as recited in claim 4, further comprising:
based at least in part on the additional analysis, determining that at least some of the plurality of warnings represent verified errors; and
generating one or more recommendations for program code modifications eliminating at least some of the verified errors.

11. The method as recited in claim 4, further comprising:
based at least in part on the additional analysis, determining that at least some of the plurality of warnings represent verified errors; and
generating modified program code that eliminates at least some of the verified errors.

12. One or more non-transitory computer-readable storage media storing computer-executable program instructions to perform:
receiving a first report generated using initial static analysis of program code, wherein the first report comprises a plurality of warnings regarding the program code, wherein at least some of the warnings represent potential errors in the program code, and wherein the plurality of warnings are associated with a plurality of segments of the program code;
determining a plurality of analysis techniques to at least detect false positives for at least some of the plurality of warnings according to a mapping between different types of warnings and individual analysis techniques of the plurality of analysis techniques to at least detect false positives;

initiating additional analysis of at least some of the plurality of segments of the program code using the determined plurality of analysis techniques to at least detect false positives, wherein different analysis techniques to at least detect false positives of the determined plurality of analysis techniques to at least detect false positives are performed for different segments of the at least some of the plurality of segments of the program code based on a type of warning for each of the different segments, wherein the additional analysis differs at least in part from the initial static analysis, and wherein the additional analysis comprises dynamic analysis for at least one of the at least some of the plurality of segments of the program code;

based at least in part on the additional analysis, determining that at least some of the plurality of warnings represent false positives and determining that at least some of the plurality of warnings represent true positives; and generating a second report indicating a plurality of verified warnings regarding the program code, wherein the plurality of verified warnings include the true positives and do not include the false positives.

13. The one or more non-transitory computer-readable storage media as recited in claim 12, wherein the additional analysis comprises static analysis for at least some of the plurality of segments of the program code.

14. The one or more non-transitory computer-readable storage media as recited in claim 12, wherein the program instructions are further computer-executable to perform:

generating one or more recommendations for program code modifications eliminating at least some of the verified warnings.

15. The one or more non-transitory computer-readable storage media as recited in claim 12, wherein the additional analysis comprises model checking for at least some of the plurality of segments of the program code.

16. The one or more non-transitory computer-readable storage media as recited in claim 12, wherein the additional analysis comprises a plurality of analysis tasks, and wherein at least a portion of the analysis tasks are assigned to a plurality of computing devices in a distributed system and performed in parallel.

17. The one or more non-transitory computer-readable storage media as recited in claim 12, wherein the program instructions are further computer-executable to perform:

generating modified program code that eliminates at least some of the verified warnings.

\* \* \* \* \*